(12) United States Patent
Takazane

(10) Patent No.: US 9,882,339 B2
(45) Date of Patent: Jan. 30, 2018

(54) LASER OSCILLATION DEVICE HAVING LASER MEDIUM CIRCULATING TUBE

(71) Applicant: FANUC CORPORATION, Yamanashi (JP)

(72) Inventor: Tetsuhisa Takazane, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/422,684

(22) Filed: Feb. 2, 2017

(65) Prior Publication Data
US 2017/0229833 A1  Aug. 10, 2017

(30) Foreign Application Priority Data
Feb. 8, 2016 (JP) ................. 2016-022022

(51) Int. Cl.
| | |
|---|---|
| H01S 3/22 | (2006.01) |
| H01S 3/041 | (2006.01) |
| H01S 3/102 | (2006.01) |
| H01S 3/104 | (2006.01) |
| H01S 3/131 | (2006.01) |
| H01S 3/134 | (2006.01) |
| H01S 3/0943 | (2006.01) |
| H01S 3/097 | (2006.01) |

(52) U.S. Cl.
CPC .............. *H01S 3/041* (2013.01); *H01S 3/104* (2013.01); *H01S 3/1026* (2013.01); *H01S 3/134* (2013.01); *H01S 3/1317* (2013.01); *H01S 3/097* (2013.01); *H01S 3/0943* (2013.01); *H01S 3/22* (2013.01)

(58) Field of Classification Search
CPC .......... H01S 3/041; H01S 3/04; H01S 3/1026; H01S 3/1317; H01S 3/0943; H01S 3/097; H01S 3/104; H01S 3/134; H01S 3/22
See application file for complete search history.

(56) References Cited

U.S. PATENT DOCUMENTS

| | | | | |
|---|---|---|---|---|
| 5,422,906 A | * | 6/1995 | Karasaki ............... | H01S 3/0014 372/108 |
| 9,484,704 B2 | * | 11/2016 | Yoshida .............. | H01S 3/09705 |
| 2003/0179798 A1 | * | 9/2003 | Egawa ...................... | H01S 3/03 372/69 |

FOREIGN PATENT DOCUMENTS

PH    H 07-231129 A    8/1995

* cited by examiner

*Primary Examiner* — Kinam Park
(74) *Attorney, Agent, or Firm* — RatnerPrestia

(57) ABSTRACT

A laser oscillation device can prevent a laser medium-circulating pipe from expanding. The laser oscillation device includes a resonator part, which has an introduction port, through which a laser medium is introduced, and a discharge port, from which the laser medium is discharged, and which generates a laser beam, a laser medium-circulating pipe having one end connected to the introduction port, and the other end connected to the discharge port, a blower arranged in the laser medium-circulating pipe, to circulate the laser medium so that the laser medium is introduced from the introduction port to the resonator part, and the laser medium introduced to the resonator part is discharged from the discharge port, and a heat-insulating mechanism which is provided in the laser medium-circulating pipe, to block heat conduction between the laser medium flowing through the laser medium-circulating pipe and the laser medium-circulating pipe.

12 Claims, 13 Drawing Sheets

LASER OSCILLATION DEVICE HAVING LASER MEDIUM CIRCULATING TUBE

BACKGROUND OF THE INVENTION

1. Field of the Invention

The invention relates to a laser oscillation device provided with a laser medium-circulating pipe.

2. Description of the Related Art

A laser oscillation device, which includes a laser medium-circulating pipe and a blower, to circulate a laser medium supplied to a resonator part for generating a laser beam, has been known (see, for example, Japanese Unexamined Patent Publication (Kokai) No. 7-231129).

The temperature of the laser medium discharged from the resonator part discharging an electrical current tends to increase. Such a laser medium having the increased temperature heats the laser medium-circulating pipe, and thus, the laser medium-circulating pipe can be thermally expanded. Such an expansion of the laser medium-circulating pipe may move components of the resonator part, and accordingly, the prevention of the expansion is desired.

SUMMARY OF THE INVENTION

In an aspect of the invention, a laser oscillation device comprises a resonator part including an introduction port, through which a laser medium is introduced, and a discharge port, from which the laser medium is discharged, the resonator part generating a laser beam; and a laser medium-circulating, one end of which is connected to the introduction port, and the other end of which is connected to the discharge port.

The laser oscillation device also comprises a blower arranged in the laser medium-circulating pipe, and configured to flow the laser medium so that the laser medium is introduced into the resonator part through the introduction port and that the laser medium introduced into the resonator part is discharged from the discharge port; and a heat-insulating mechanism provided in the laser medium-circulating pipe, and configure to block heat conduction between the laser medium flowing through the laser medium-circulating pipe and the laser medium-circulating pipe.

The heat-insulating mechanism may be provided over a section between the other end of the laser medium-circulating pipe and a position in the laser medium-circulating pipe downstream of the other end of the laser medium-circulating pipe. The heat-insulating mechanism may includes a heat-insulating material attached to an inner surface of the laser medium-circulating pipe.

The heat-insulating mechanism may includes a heat-insulating pipe arranged so as to be separate inward from an inner surface of the laser medium-circulating pipe, the heat-insulating pipe extending along the laser medium-circulating pipe. In this case, the laser medium discharged from the discharge port flows into the heat-insulating pipe, whereas the laser medium does not flow into a gap between the laser medium-circulating pipe and the heat-insulating pipe.

The heat-insulating pipe may be supported by the laser medium-circulating pipe at an upstream end or a downstream end of the heat-insulating pipe. The heat-insulating mechanism may include a rectification mechanism configured to rectify a flow of the laser medium in the laser medium-circulating pipe.

The rectification mechanism may include a partition wall configured to divide a cross-sectional area of the inside of the laser medium-circulating pipe along a plane intersecting with the longitudinal direction of the laser medium-circulating pipe, into a plurality of sections. The rectification mechanism may include a protrusion formed so as to project from an inner surface of the laser medium-circulating pipe.

The laser medium-circulating pipe may include a curved part smoothly and seamlessly extending to curve. The laser medium-circulating pipe may include a straight tube part straightly extending from the other end of the laser medium-circulating pipe toward downstream side. The straight tube part may have a length three or more times larger than the equivalent diameter of the straight tube part.

The laser medium-circulating pipe may include a corrugated part provided so as to be adjacent to the other end of the laser medium-circulating pipe. The laser oscillation device may further comprise a heat exchanger arranged between the blower and the discharge port so as to remove heat from the laser medium flowing through the laser medium-circulating pipe. The heat-insulating mechanism may be provided over a section between the other end of the laser medium-circulating pipe and the heat exchanger.

BRIEF DESCRIPTION OF THE DRAWINGS

The above-mentioned and other objects, features, and advantages of the invention will be clarified by the detailed description of embodiments with reference to the accompanying drawings, in which.

DETAILED DESCRIPTION

Figure 1:
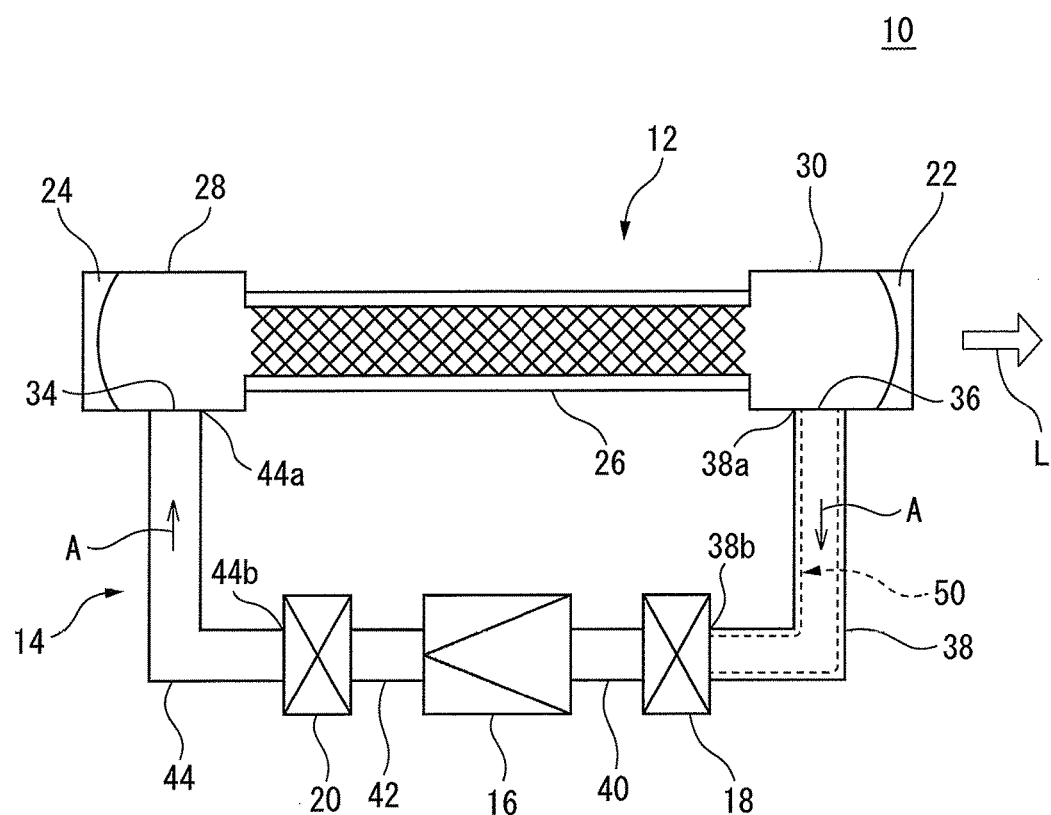
FIG. 1 is a view of a laser oscillation device according to an embodiment.

Embodiments of the invention will be described below based on the drawings. Note that, in various embodiments described below, elements similar to those of already-described embodiments are assigned the same reference numerals, and detailed descriptions thereof will be omitted.

First, with reference to FIG. 1, a laser oscillation device 10 according to an embodiment of the invention will be described. The laser oscillation device 10 includes a resonator part 12, a laser medium-circulating pipe 14, a blower 16, and heat exchangers 18 and 20.

The resonator part 12 includes an output mirror 22, a rear mirror 24, an electric discharge tube 26, and electric discharge tube-supporting parts 28 and 30. The output mirror 22 and the rear mirror 24 are arranged so as to be opposite to each other. The output mirror 22 is comprised of a partial reflection mirror (so-called, "half mirror"), while the rear mirror 24 is comprised of a total reflection mirror.

The electric discharge tube 26 is arranged between the output mirror 22 and the rear mirror 24. One end of the electric discharge tube 26 is supported by the electric discharge tube-supporting part 28, and the other end of the electric discharge tube 26 is supported by the electric discharge tube-supporting part 30.

The electric discharge tube 26 includes discharge electrodes arranged so as to be opposite to each other (not shown). Voltage is applied from a laser power source (not shown) to the discharge electrodes. A laser medium, such as carbon dioxide gas, nitrogen gas, or argon gas is supplied into the electric discharge tube 26.

When the voltage is applied from the laser power source to the discharge electrodes, the laser medium is excited due to electric discharge generated between the discharge electrodes, so as to generate a laser beam. The laser beam generated in the electric discharge tube 26 is amplified by optical resonance between the output mirror 22 and the rear mirror 24, and emitted to the outside through the output mirror 22 as an output laser beam L.

The electric discharge tube-supporting part 28 is a hollow member, inside of which the rear mirror 24 is mounted. The inside of the electric discharge tube-supporting part 28 is in fluid communication with the inside of the electric discharge tube 26. The electric discharge tube-supporting part 28 has an introduction port 34, through which the laser medium is introduced.

The electric discharge tube-supporting part 30 is a hollow member similar to the above-mentioned electric discharge tube-supporting part 28, and the output mirror 22 is mounted inside of the electric discharge tube-supporting part 30. The inside of the electric discharge tube-supporting part 30 is in fluid communication with the inside of the electric discharge tube 26. The electric discharge tube-supporting part 30 has a discharge port 36, from which the laser medium is discharged.

The laser medium-circulating pipe 14 defines a flow path of the laser medium to be supplied into the resonator part 12. In this embodiment, the laser medium-circulating pipe 14 includes a first tube 38, a second tube 40, a third tube 42, and a fourth tube 44.

One end 38a of the first tube 38 is connected to the discharge port 36 formed at the electric discharge tube-supporting part 30, and the other end 38b of the first tube 38 is connected to the heat exchanger 18. The inside of the first tube 38 is in fluid communication with the inside of the electric discharge tube-supporting part 30 through the discharge port 36.

The second tube 40 extends between the heat exchanger 18 and the blower 16. The inside of the second tube 40 is in fluid communication with the inside of the first tube 38 through the heat exchanger 18.

The third tube 42 extends between the blower 16 and the heat exchanger 20. The inside of the third tube 42 is in fluid communication with the inside of the second tube 40 through the blower 16.

One end 44a of the fourth tube 44 is connected to the introduction port 34 formed at the electric discharge tube-supporting part 28, and the other end 44b of the fourth tube 44 is connected to the heat exchanger 20. The inside of the fourth tube 44 is in fluid communication with the inside of the electric discharge tube-supporting part 28 through the introduction port 34, and is in fluid communication with the third tube 42 through the heat exchanger 20.

The blower 16 is arranged between the second tube 40 and the third tube 42, and generates pressure fluctuations in the laser medium in the laser medium-circulating pipe 14 so as to cause the laser medium to flow in the direction indicated by the arrow A in FIG. 1.

Due to this, the laser medium is introduced from the fourth tube 44 into the electric discharge tube-supporting part 28 through the introduction port 34, then flows through the electric discharge tube 26, and then is discharged from the discharge port 36 to the first tube 38. Thus, the circulation path of the laser medium is defined by the laser medium-circulating pipe 14 and the resonator part 12.

The heat exchanger 18 is arranged upstream of the blower 16, and removes heat from the laser medium passing through the first tube 38. The heat exchanger 20 is arranged downstream of the blower 16, and removes heat from the laser medium passing through the third tube 42.

The laser oscillation device 10 further includes a heat-insulating mechanism 50 provided in the laser medium-circulating pipe 14. Below, an example of the heat-insulating mechanism 50 will be described with reference to FIG. 2.

Figure 2:
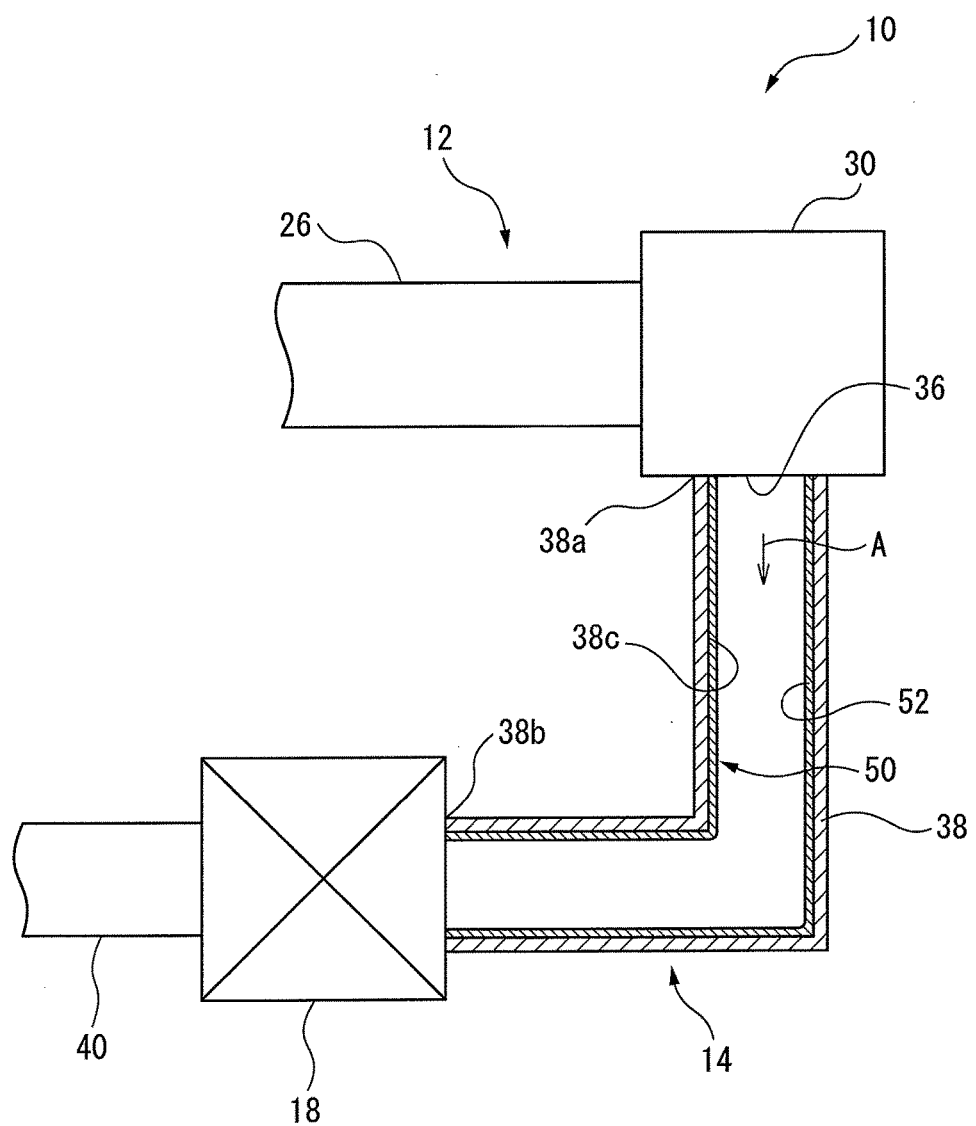
FIG. 2 is a view of an example of the heat-insulating mechanism shown in FIG. 1, in which the first tube of the laser medium-circulating pipe is shown by cross-section.

In the example shown in FIG. 2, the heat-insulating mechanism 50 is comprised of a heat-insulating material 52 attached to an inner surface 38c of the first tube 38. The heat-insulating material 52 is attached so as to extend over a section between the upstream end 38a and the downstream end 38b of the first tube 38, and to cover the entire area of the inner surface 38c of the first tube 38.

The heat-insulating material 52 blocks heat conduction between the laser medium flowing through the first tube 38 and the first tube 38. According to this embodiment, it is possible to prevent the first tube 38 from thermally expanding in its longitudinal direction due to the first tube 38 being heated by the high temperature-laser medium discharged from the discharge port 36 when the resonator part 12 generates the laser beam.

The first tube 38 extends between the discharge port 36 and the heat exchanger 18, and thereby is a portion of the laser medium-circulating pipe 14, which is most-easily heated by the laser medium discharged from the discharge port 36. In this embodiment, since the heat-insulating material 52 is provided in the first tube 38 to be most-easily heated, it is possible to effectively prevent the laser medium-circulating pipe 14 from thermally expanding due to the heat.

Next, with reference to FIG. 3, another example of the heat-insulating mechanism 50 will be described. In the example shown in FIG. 3, the heat-insulating mechanism 50 is comprised of a heat-insulating pipe 54. The heat-insulating pipe 54 is arranged to be separate inward from the inner surface 38c of the first tube 38.

The heat-insulating pipe 54 extends along the first tube 38 over a section from the upstream end 38a of the first tube 38 to a position slightly upstream of the downstream end 38b of the first tube 38. A flange 56 is formed at an upstream end 54a of the heat-insulating pipe 54 so as to project out from the end 54a.

The flange 56 is fixed to the first tube 38. Thus, the heat-insulating pipe 54 is supported by the first tube 38 via the flange 56 so as to be separate inward from the inner surface 38c of the first tube 38. On the other hand, an downstream end 54b of the heat-insulating pipe 54 is a free end, and is arranged to be separate upstream from the heat exchanger 18.

A gap 58 is formed between the inner surface 38c of the first tube 38 and an outer surface 54d of the heat-insulating pipe 54. The laser medium discharged from the discharge port 36 flows into the heat-insulating pipe 54, flows through the heat-insulating pipe 54, and is introduced to the heat exchanger 18.

According to this embodiment, heat conduction between the laser medium flowing through the heat-insulating pipe 54 and the first tube 38 can be blocked by the gap 58 between the first tube 38 and the heat-insulating pipe 54. Therefore, it is possible to prevent the first tube 38 from thermally expanding in its longitudinal direction due to the first tube 38 being heated by the high temperature-laser medium discharged from the discharge port 36.

Further, according to this embodiment, since the heat-insulating pipe 54 is provided in the first tube 38, which is most-easily heated by the laser medium discharged from the discharge port 36, it is possible to effectively prevent the laser medium-circulating pipe 14 from thermally expanding due to the heat of the laser medium.

Further, in this embodiment, the heat-insulating pipe 54 is supported by the first tube 38 via the flange 56 at its upstream end 54a, while its downstream end 54b is a free end.

According to this configuration, even if the heat-insulating pipe 54 is heated due to the heat conduction from the laser medium, the heat-insulating pipe 54 can thermally expand so that its end part 54b approaches the heat exchanger 18. Therefore, it is possible to prevent the components of the resonator part 12 from being displaced due to the thermal expansion of the heat-insulating pipe 54.

Next, with reference to FIG. 4, still another example of the heat-insulating mechanism 50 will be described. In the example shown in FIG. 4, the heat-insulating mechanism 50 includes the heat-insulating material 52, the heat-insulating pipe 54, and a second heat-insulating material 60 attached to an inner surface 54c of the heat-insulating pipe 54.

The laser medium discharged from the discharge port 36 flows into the heat-insulating pipe 54. The second heat-insulating material 60 blocks heat conduction between the heat-insulating pipe 54 and the laser medium flowing through the heat-insulating pipe 54. According to the heat-insulating mechanism 50 of this embodiment, the heat conduction from the laser medium to the first tube 38 can be more-effectively blocked by the heat-insulating material 52, the heat-insulating pipe 54, and the second heat-insulating material 60. Therefore, it is possible to more-effectively prevent the first tube 38 from thermally expanding in its longitudinal direction.

Next, with reference to FIGS. 5 and 6, a laser oscillation device 70 according to another embodiment will be described. The laser oscillation device 70 includes the resonator part 12, the laser medium-circulating pipe 14, the blower 16, the heat exchangers 18 and 20, and the heat-insulating mechanism 50. The heat-insulating mechanism 50 according to this embodiment includes the heat-insulating material 52 and a rectification mechanism 72.

The rectification mechanism 72 is provided in a section of the laser medium-circulating pipe 14, in which the heat-insulating material 52 is provided, i.e., the inside of the first tube 38. As shown in FIG. 6, the rectification mechanism 72 includes a partition wall 72a. The partition walls 72a divide a cross-sectional area of the inner space of the first tube 38 along a plane perpendicular to the extension direction of the first tube 38, into a plurality of sections.

The partition wall 72a according to this embodiment have a honeycomb structure, and divide the cross-sectional area of the inner space of the first tube 38 into a plurality of hexagonal sections. The flow of the laser medium in the first tube 38 is rectified by being divided into a plurality of laminar flows when passing through the partition walls 72a. Thereby, it is possible to prevent a turbulence flow from occurring in the laser medium.

If the flow of the laser medium is rectified as described above, the temperature distribution of the laser medium flowing through the first tube 38 changes so that a region close to a center axis of the first tube 38 becomes a relatively high temperature, whereas a region close to the inner surface 38c of the first tube 38 becomes a relatively low temperature.

In other words, the rectification mechanism 72 serves the function of relatively lowering the temperature of the laser medium at the region close to the first tube 38 by rectifying the flow of the laser medium, thereby blocking heat conduction from the laser medium to the first tube 38.

In this embodiment, the heat-insulating mechanism 50 is comprised of the heat-insulating material 52 and the rectification mechanism 72, thereby it is possible to more-effectively prevent the first tube 38 from thermally expanding due to the heat from the laser medium.

Figure 7:
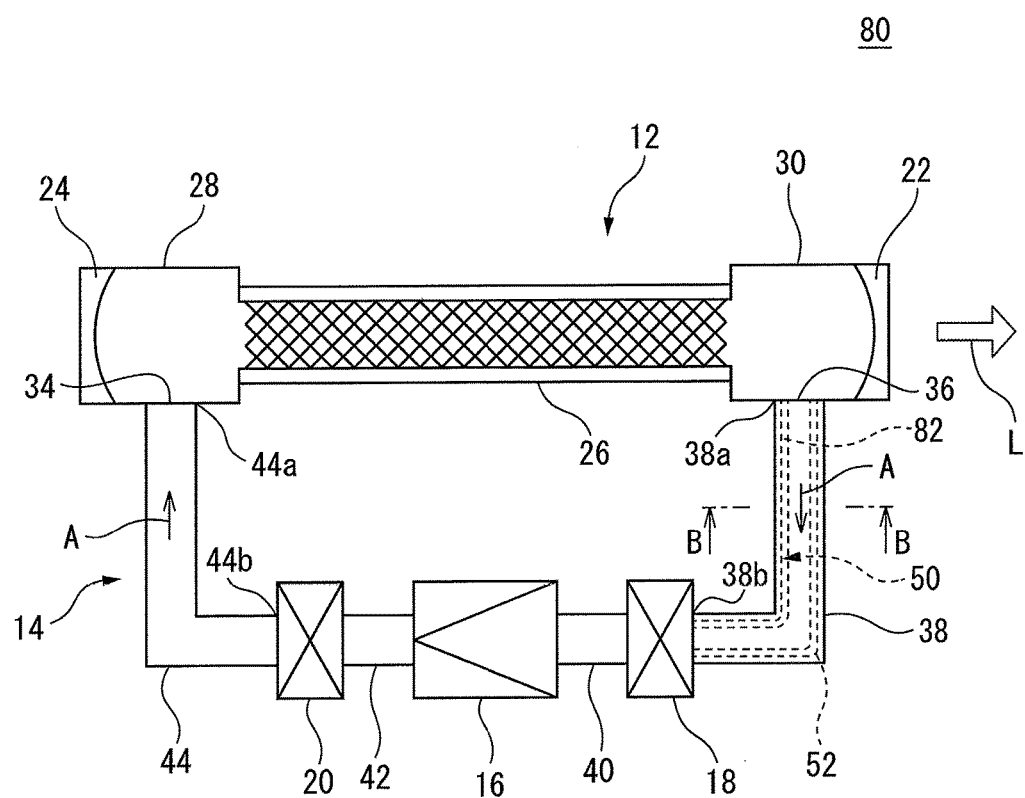
FIG. 7 is a view of a laser oscillation device according to still another embodiment.
Figure 8:
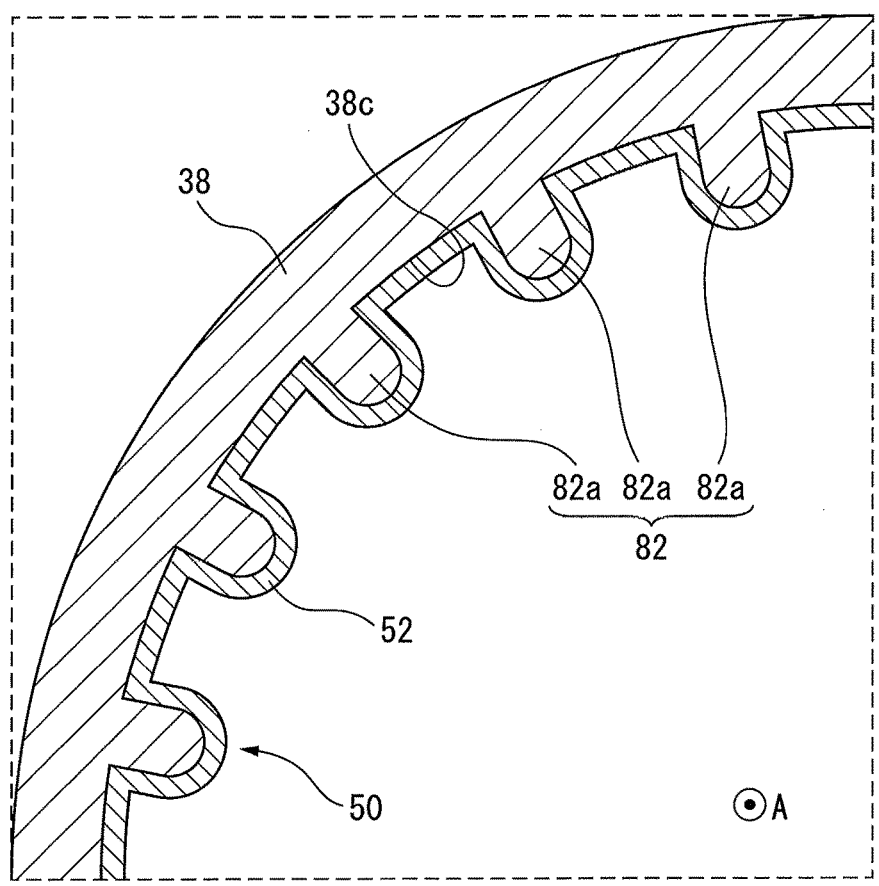
FIG. 8 is an enlarged cross-sectional view of a part of the first tube of the laser medium-circulating pipe shown in FIG. 7, cut along B-B in FIG. 7.

Next, with reference to FIGS. 7 and 8, a laser oscillation device 80 according to still another embodiment will be described. The laser oscillation device 80 includes the resonator part 12, the laser medium-circulating pipe 14, the blower 16, the heat exchanger 18, the heat exchanger 20, and a heat-insulating mechanism 50. The heat-insulating mechanism 50 includes the heat-insulating material 52 and a rectification mechanism 82.

The rectification mechanism 82 is provided in a portion of the laser medium-circulating pipe 14, in which the heat-insulating material 52 is provided, i.e., the inside of the first tube 38. As shown in FIG. 8, the rectification mechanism 82 includes a plurality of protrusions 82a formed on the inner surface of the first tube 38.

The protrusions 82a project inward from the inner surface 38c of the first tube 38, and are arranged so as to align in the circumferential direction of the inner surface 38c. Each protrusion 82a is formed so as to extend in the longitudinal direction of the first tube 38, i.e., the flow direction A of the laser medium. The heat-insulating material 52 is attached inside of the first tube 38 so as to cover the inner surface 38c and the protrusions 82a.

The protrusions 82a rectify the flow of the laser medium in the first tube 38 so as to be laminar flow. Thus, the protrusions 82a prevent a turbulence flow from occurring in the laser medium, thereby relatively decrease the temperature of the laser medium at a region close to the first tube 38. In this way, the rectification mechanism 82 serves the function of blocking heat conduction from the laser medium to the first tube 38.

In this embodiment, the heat-insulating mechanism 50 is comprised of the heat-insulating material 52 and the rectification mechanism 82, by which it is possible to more-effectively prevent the first tube 38 from thermally expanding due to the heat from the laser medium.

Figure 9:
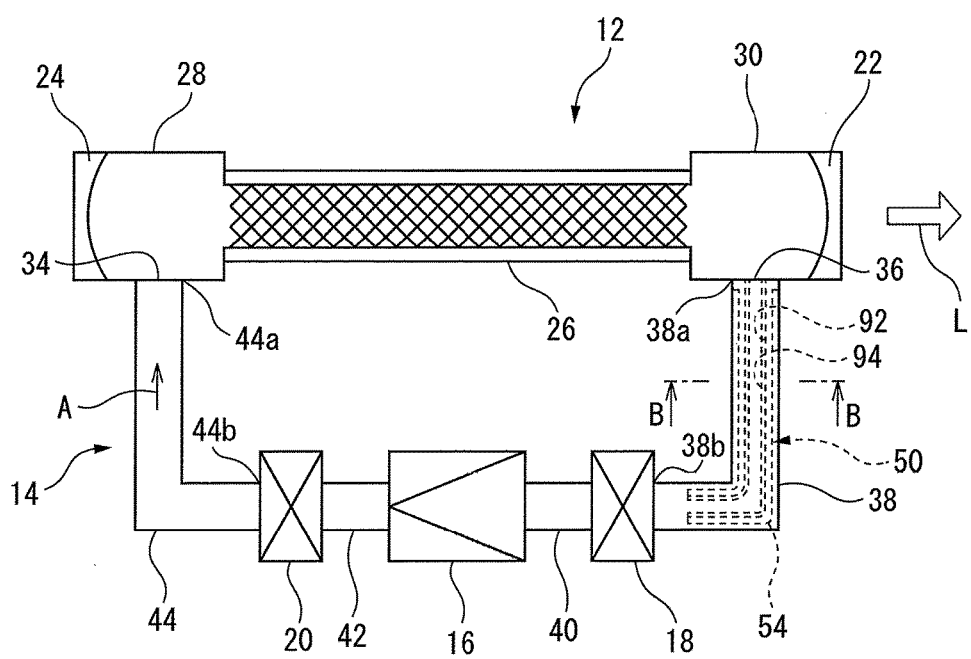
FIG. 9 is a view of a laser oscillation device according to still another embodiment.
Figure 10:
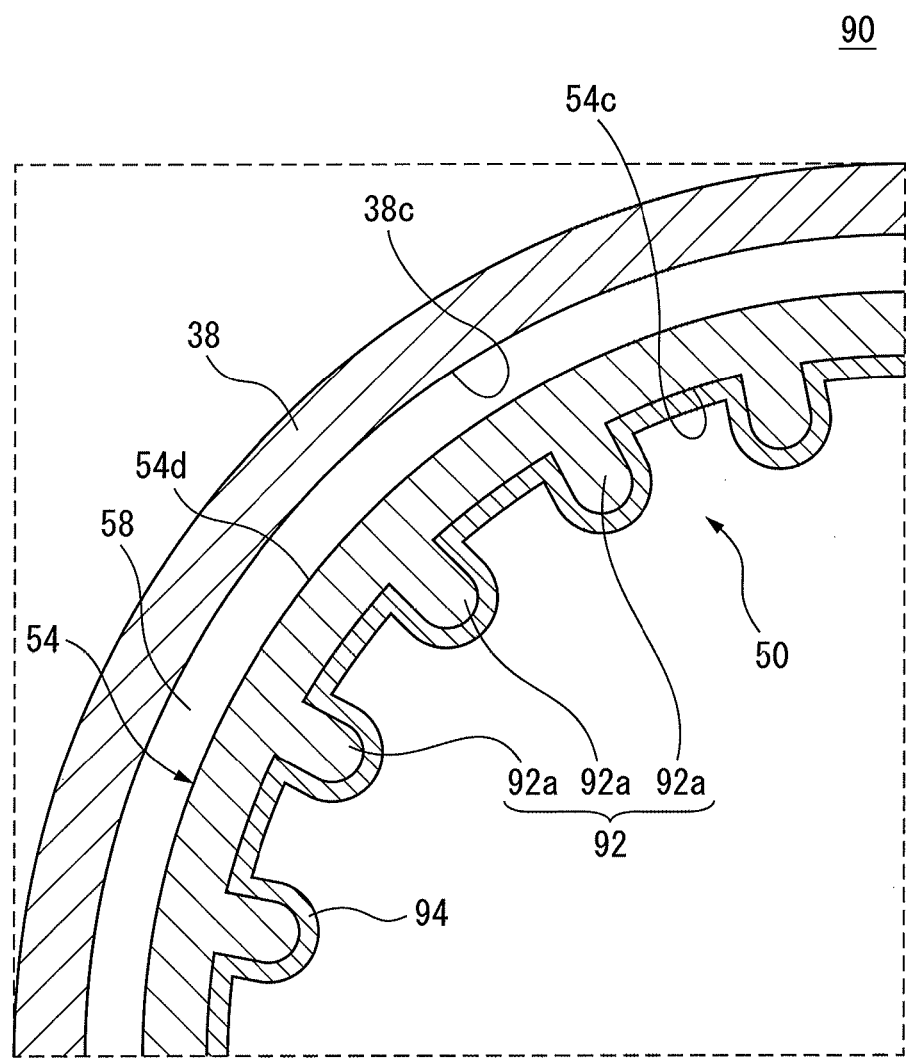
FIG. 10 is an enlarged cross-sectional view of a part of the first tube of the laser medium-circulating pipe shown in FIG. 9, cut along B-B in FIG. 9.

Next, with reference to FIGS. 9 and 10, a laser oscillation device 90 according to still another embodiment will be described. The laser oscillation device 90 includes the resonator part 12, the laser medium-circulating pipe 14, the blower 16, the heat exchanger 18, the heat exchanger 20, and a heat-insulating mechanism 50. The heat-insulating mechanism 50 includes the heat-insulating pipe 54, a rectification mechanism 92, and a heat-insulating material 94.

The rectification mechanism 92 includes a plurality of protrusions 92a formed on the inner surface 54c of the heat-insulating pipe 54. The protrusions 92a project inward from the inner surface 54c of the heat-insulating pipe 54, and are arranged so as to align in the circumferential direction of the inner surface 54c.

Each protrusion 92a is formed so as to extend in the longitudinal direction of the heat-insulating pipe 54, i.e., the flow direction A of the laser medium. The heat-insulating material 94 is attached so as to cover the inner surface 54c of the heat-insulating pipe 54 and the protrusions 92a.

Similarly as the above-mentioned protrusions 82a, the protrusions 92a rectify the flow of the laser medium in the first tube 38 so as to be laminar flow. Thus, the protrusions 92a prevent a turbulence flow from occurring in the laser medium, thereby relatively decrease the temperature of the laser medium at a region close to the first tube 38. In this way, the rectification mechanism 92 serves the function of blocking heat conduction from the laser medium to the first tube 38.

In this embodiment, the heat-insulating mechanism 50 is comprised of the heat-insulating pipe 54, the rectification mechanism 92, and the heat-insulating material 94, by which it is possible to more-effectively prevent the first tube 38 from thermally expanding due to the heat from the laser medium.

Note that, there are various variations for the first tube 38 shown in FIG. 1. Below, with reference to FIG. 11, a first tube 38' according to a variation of the first tube 38 will be described.

In a laser oscillation device 10' according to this embodiment, the first tube 38' includes a curved part 38d' which smoothly and seamlessly extends to curve (i.e., smoothly curves without any joint line). The first tube 38' can be made by bending one seamless straight-tube. By making the first tube 38' in this way, a joint line, which is to be formed when two tubes are coupled with each other by welding, etc., is prevented from being formed at the curved part 38d'.

Providing the thus curved part 38d' causes the flow of the laser medium in the first tube 38' to be laminar flow when the laser medium passes through the curved part 38d', thereby it is possible to prevent a turbulence flow from occurring in the flow of the laser medium. Consequently, the temperature of the laser medium can be relatively reduced at a region close to the first tube 38', as a result of which, it is possible to prevent the first tube 38' from being heated.

Figure 3:
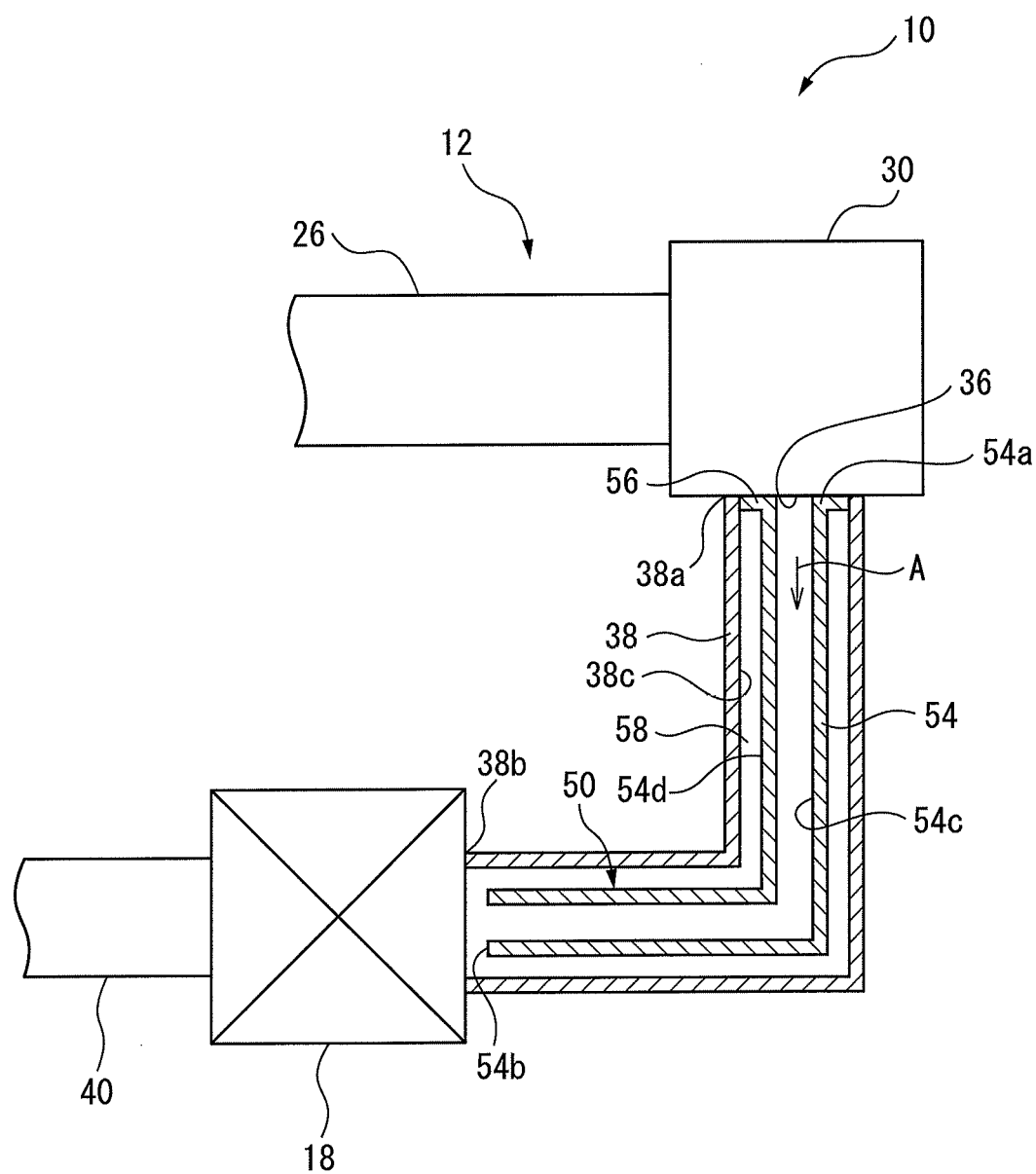
FIG. 3 is a view of another example of the heat-insulating mechanism shown in FIG. 1, in which the first tube of the laser medium-circulating pipe is shown by cross-section.
Figure 11:
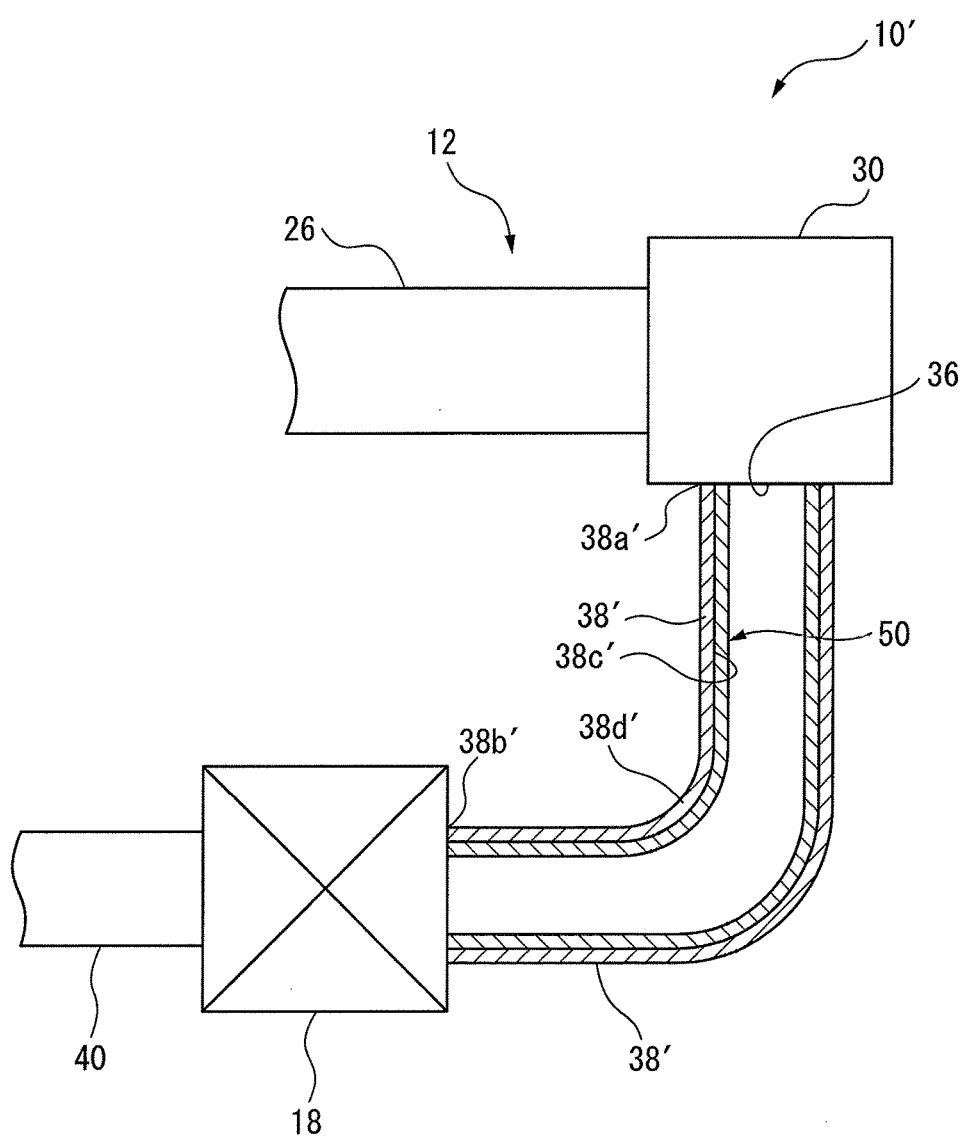
FIG. 11 is a cross-sectional view of a variation of the first tube shown in FIG. 1.

Note that, if the heat-insulating pipe 54 shown in FIG. 3 is applied to the heat-insulating mechanism 50 shown in FIG. 11, the heat-insulating pipe 54 in this case includes a curved part (not shown) extending along the curved part 38d' of the first tube 38' at a position corresponding to the curved part 38d'. In this case, the curved part 38d' of the first tube 38' may have a curvature substantially the same as the curved part of the heat-insulating pipe 54.

Figure 12:
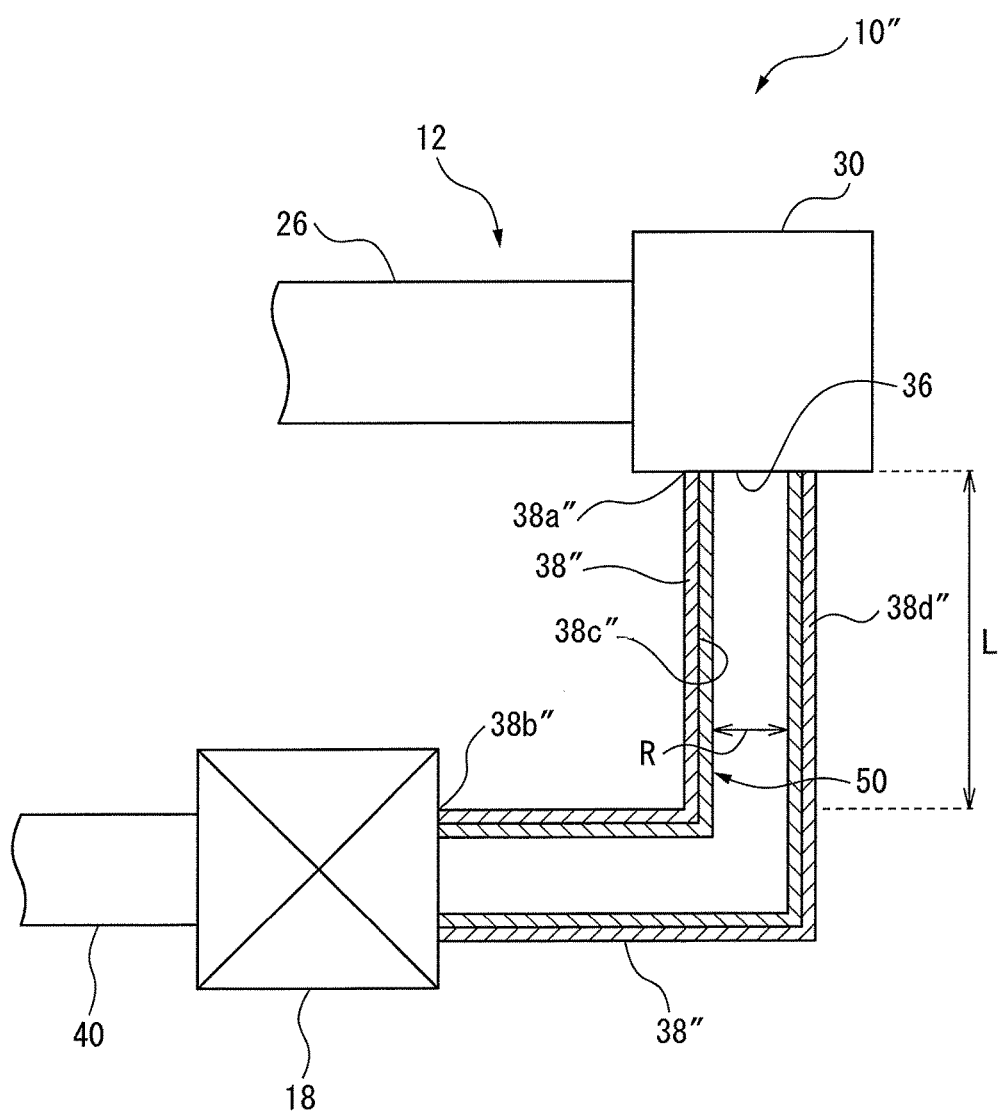
FIG. 12 is a cross-sectional view of another variation of the first tube shown in FIG. 1.

Next, with reference to FIG. 12, a first tube 38" according to another variation of the first tube 38 will be described. In a laser oscillation device 10" according to this embodiment, a first tube 38" includes a straight tube part 38d" straightly extending from an end 38a" connected to the discharge port 36 toward downstream side. The length L of the straight tube part 38d" is set to be three or more times larger than the equivalent diameter R of the inner peripheral surface of the straight tube part 38d".

The flow of the laser medium in the straight tube part 38d" is turned into laminar flow, thereby a turbulence flow can be prevented from occurring in the flow of the laser medium. Accordingly, the temperature of the laser medium can be relatively reduced at a region close to the first tube 38", as a result of which, it is possible to prevent the first tube 38" from being heated.

Next, with reference to FIG. 13, a first tube 38''' according to still another variation of the first tube 38 will be described. In a laser oscillation device 10''' according to this embodiment, the first tube 38''' includes a corrugated part 38d'''.

The corrugated part 38d''' is provided so as to be adjacent to an end 38a''' of the first tube 38'''. Even if the first tube 38''' thermally expands in its longitudinal direction due to the heat of the laser medium, the corrugated part 38d''' can absorb such a thermal expansion.

Figure 4:
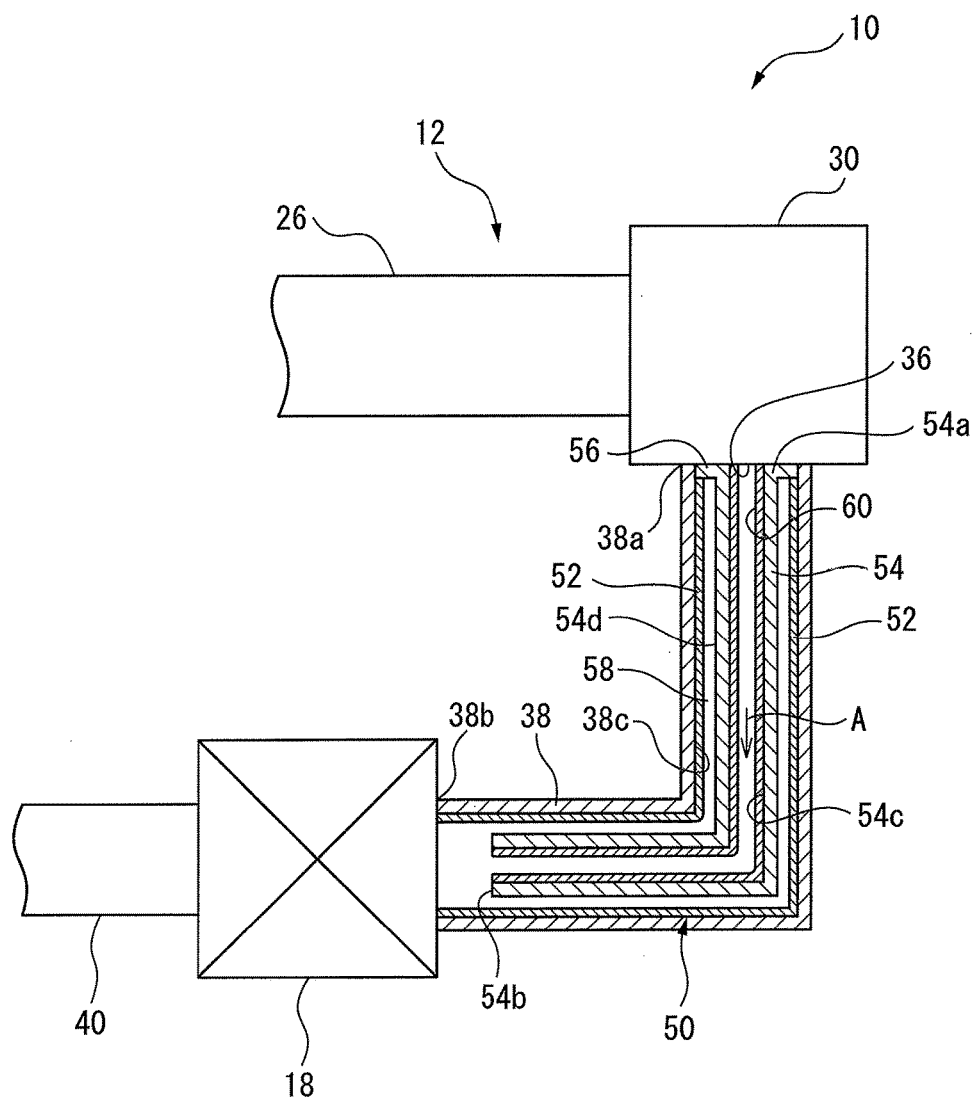
FIG. 4 is a view of still another example of the heat-insulating mechanism shown in FIG. 1, in which the first tube of the laser medium-circulating pipe is shown by cross-section.
Figure 13:
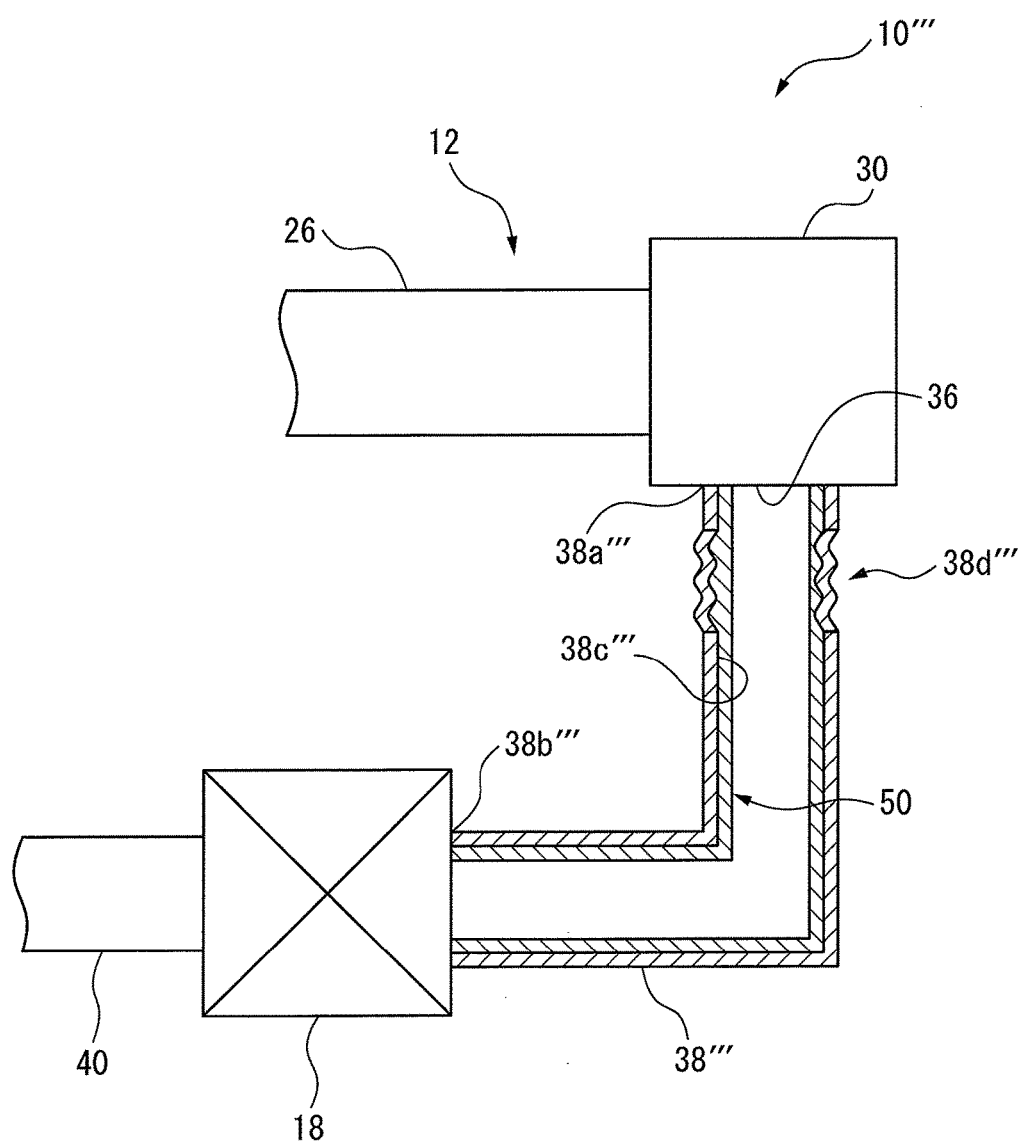
FIG. 13 is a sectional view of still another variation of the first tube shown in FIG. 1.

The configuration of the heat-insulating mechanism 50 shown in FIG. 2, 3, or 4 can be applied in this embodiment shown in FIG. 13. Thus, in this embodiment, the heat-insulating mechanism 50 blocks heat conduction from the laser medium to the first tube 38''', and the corrugated part 38d''' absorbs the thermal expansion of the first tube 38'''.

According to this configuration, it is possible to more-reliably prevent the components of the resonator part 12 from being moved by the thermal expansion of the first tube 38'''.

Note that, the heat-insulating mechanism 50 may be provided so as to extend between a first position of the laser medium-circulating pipe 14 at downstream of the discharge port 36 and a second position of the laser medium-circulating pipe 14 at downstream of the first position. Alternatively, the heat-insulating mechanism 50 may be provided so as to extend over the entirety of the laser medium-circulating pipe 14.

Further, the heat-insulating mechanism 50 may include only the rectification mechanism 72, 82, or 92. Even in this instance, the heat-insulating mechanism 50 can relatively decrease the temperature of the laser medium at a region close to the first tube 38, thereby can block heat conduction between the first tube 38 and the laser medium.

Further, the heat exchanger 18 or 20 may be omitted. For example, if the heat exchanger 18 is omitted, the first tube 38 may extend between the discharge port 36 and the blower 16, wherein the heat-insulating mechanism 50 may be provided so as to extend within a section between the end 38a of the first tube 38 connected to the discharge port 36 and the blower 16 (or a position upstream of the blower 16).

Further, the laser medium-circulating pipe 14 may be a cylindrical member or a polygonal tube member.

Figure 5:
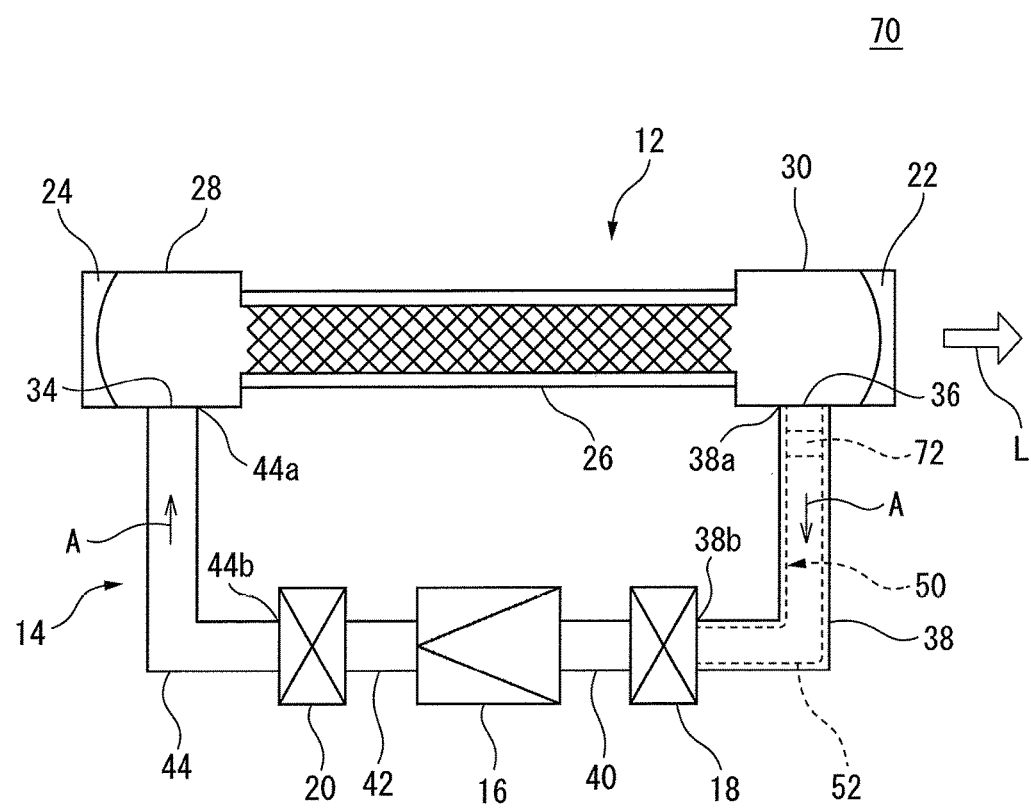
FIG. 5 is a view of a laser oscillation device according to another embodiment.

Further, in the embodiment shown in FIG. 5, a plurality of rectification mechanisms 72 may be provided. For example, a plurality of rectification mechanisms 72 may be provided in the first tube 38. Alternatively, a first rectification mechanism 72 is provided in the first tube 38, while a second rectification mechanism 72 is provided in the second tube 40, the third tube 42, or the fourth tube 44.

Figure 6:
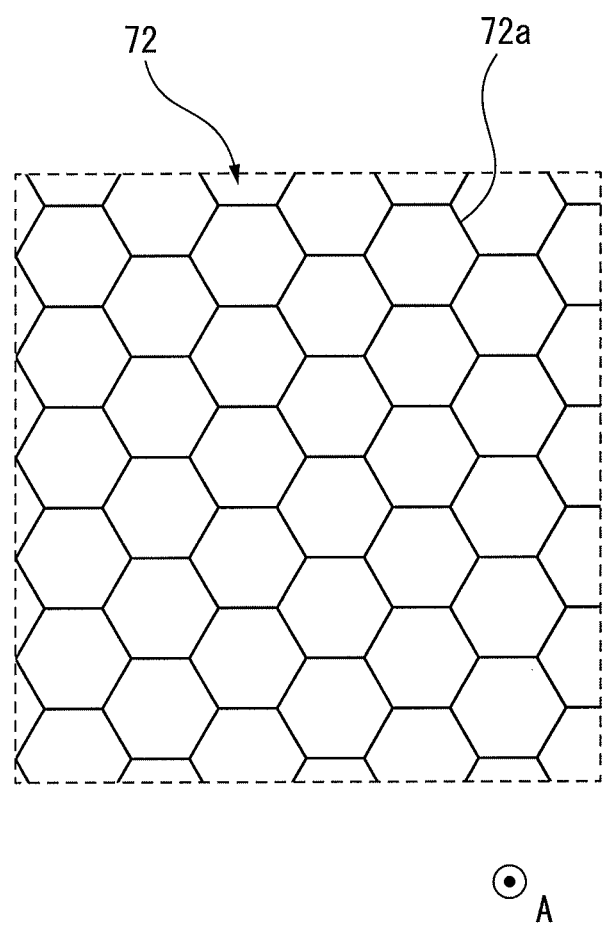
FIG. 6 is an enlarged view of a part of the rectification mechanism shown in FIG. 5, when seen from the direction indicated by arrow A in FIG. 5 (i.e., the flow direction of a laser medium)

Further, the configuration of the rectification mechanism 72 is not limited to the honeycomb structure as shown in FIG. 6. For example, the rectification mechanism 72 may have a partition wall configured to divide a cross-sectional area of the inner space of the laser medium-circulating pipe 14 into two or four zones. Further, the shape of each section divided by the partition wall is not limited to the hexagonal shape as shown in FIG. 6, and may be a polygonal, circular, or oval shape. Further, the rectification mechanism includes the partition walls 72a and the protrusions 82a or 92a.

Further, in the heat-insulating pipe 54 shown in FIG. 3, the flange 56 may be formed at the downstream end 54b of the heat-insulating pipe 54. In this case, the heat-insulating pipe 54 is supported by the first tube 38 via the flange 56 at its downstream end 54b.

Although the invention has been described above through various embodiments, the embodiments do not limit the inventions according to the claims. Further, a configuration obtained by combining the features described in the embodiments of the invention can be included in the technical scope of the invention. However, all combinations of these features are not necessarily essential for solving means of the invention. Furthermore, it is obvious for a person skilled in the art that various modifications or improvements can be applied to the embodiments.

Regarding the order of operations, such as actions, sequences, steps, processes, and stages, in the devices, systems, programs, and methods indicated in the claims, specification and drawings, it should be noted that the terms "before", "prior to", etc. are not explicitly described, and any order can be realized unless the output of a previous operation is used in the subsequent operation. Regarding the processing in the claims, specification, and drawings, even when the order of operations is described using the terms "first", "next", "subsequently", "then", etc., for convenience, maintaining this order is not necessarily essential for working the inventions.

The invention claimed is:

1. A laser oscillation device comprising:
a resonator part including an introduction port, through which a laser medium is introduced, and a discharge port, from which the laser medium is discharged, the resonator part generating a laser beam;
a laser medium-circulating pipe, one end of which is connected to the introduction port, and the other end of which is connected to the discharge port;
a blower arranged in the laser medium-circulating pipe, and configured to flow the laser medium so that the laser medium is introduced into the resonator part through the introduction port and that the laser medium introduced into the resonator part is discharged from the discharge port; and
a heat-insulating mechanism provided in the laser medium-circulating pipe, and configure to block heat conduction between the laser medium flowing through the laser medium-circulating pipe and the laser medium-circulating pipe.

2. The laser oscillation device according to claim 1, wherein the heat-insulating mechanism is provided over a section between the other end of the laser medium-circulating pipe and a position in the laser medium-circulating pipe downstream of the other end of the laser medium-circulating pipe.

3. The laser oscillation device according to claim 1, wherein the heat-insulating mechanism includes a heat-insulating material attached to an inner surface of the laser medium-circulating pipe.

4. The laser oscillation device according to claim 1, wherein the heat-insulating mechanism includes a heat-insulating pipe arranged so as to be separate inward from an inner surface of the laser medium-circulating pipe, the heat-insulating pipe extending along the laser medium-circulating pipe,
wherein the laser medium discharged from the discharge port flows into the heat-insulating pipe, whereas the laser medium does not flow into a gap between the laser medium-circulating pipe and the heat-insulating pipe.

5. The laser oscillation device according to claim 4, wherein the heat-insulating pipe is supported by the laser medium-circulating pipe at an upstream end or a downstream end of the heat-insulating pipe.

6. A laser oscillation device according to claim 1, wherein the heat-insulating mechanism includes a rectification mechanism configured to rectify a flow of the laser medium in the laser medium-circulating pipe.

7. The laser oscillation device according to claim 6, wherein the rectification mechanism includes a partition wall configured to divide a cross-sectional area of an inside of the laser medium-circulating pipe along a plane intersecting with a longitudinal direction of the laser medium-circulating pipe, into a plurality of sections.

8. The laser oscillation device according to claim 6, wherein the rectification mechanism includes a protrusion formed so as to project from an inner surface of the laser medium-circulating pipe.

9. A laser oscillation device according to claim 1, wherein the laser medium-circulating pipe includes a curved part smoothly and seamlessly extending to curve.

10. A laser oscillation device according to claim 1, wherein the laser medium-circulating pipe includes a straight tube part straightly extending from the other end of the laser medium-circulating pipe toward downstream side,
wherein the straight tube part has a length three or more times larger than the equivalent diameter of the straight tube part.

11. A laser oscillation device according to claim 1, wherein the laser medium-circulating pipe includes a corrugated part provided so as to be adjacent to the other end of the laser medium-circulating pipe.

12. The laser oscillation device according to claim 1, further comprising a heat exchanger arranged between the blower and the discharge port so as to remove heat from the laser medium flowing through the laser medium-circulating pipe,
wherein the heat-insulating mechanism is provided over a section between the other end of the laser medium-circulating pipe and the heat exchanger.

* * * * *